United States Patent [19]

Leube et al.

[11] Patent Number: 5,759,347
[45] Date of Patent: Jun. 2, 1998

[54] PAPER COATING

[75] Inventors: Hartmann F. Leube; Thomas Wirth, both of Ludwigshafen, Germany; Dirk Lawrenz, Maxdorf, Germany

[73] Assignee: BASF Aktiengesellschaft, Ludwigshafen, Germany

[21] Appl. No.: 687,324

[22] PCT Filed: Jan. 23, 1995

[86] PCT No.: PCT/EP95/00224

§ 371 Date: Aug. 5, 1996

§ 102(e) Date: Aug. 5, 1996

[87] PCT Pub. No.: WO95/21294

PCT Pub. Date: Aug. 10, 1995

[30] Foreign Application Priority Data

Feb. 4, 1994 [DE] Germany .................. 44 03 480.6

[51] Int. Cl.$^6$ .................. D21H 19/36; D21H 17/34; D21H 19/58
[52] U.S. Cl. .................. 162/135; 427/391; 428/514; 428/521; 101/492; 524/828; 162/169
[58] Field of Search .................. 162/135, 136, 162/137, 169; 524/828, 834, 832, 833, 457, 556, 560, 458, 460; 427/391; 428/514, 511, 517, 521; 101/492

[56] References Cited

U.S. PATENT DOCUMENTS

| | | | |
|---|---|---|---|
| 2,791,571 | 5/1957 | Wheelock et al. | 524/828 |
| 3,875,097 | 4/1975 | Sedlak | 524/828 X |
| 4,064,304 | 12/1977 | Fujita et al. | 428/207 |
| 4,336,172 | 6/1982 | Marquardt et al. | 524/555 |
| 5,093,405 | 3/1992 | Frankel et al. | 524/460 |
| 5,093,449 | 3/1992 | Durney Cronin et al. | 526/318 |
| 5,354,800 | 10/1994 | Suzuki et al. | 524/460 |
| 5,356,683 | 10/1994 | Egolf et al. | 428/60 |
| 5,444,118 | 8/1995 | Tsuruoka et al. | 524/828 |

FOREIGN PATENT DOCUMENTS

| | | |
|---|---|---|
| A-099 792 | 6/1983 | European Pat. Off. |
| A-82/191 392 | 11/1982 | Japan |
| A-90/169 800 | 6/1990 | Japan |

Primary Examiner—Donald E. Czaja
Assistant Examiner—Jose A. Fortuna
Attorney, Agent, or Firm—Oblon, Spivak, McClelland, Maier & Neustadt, P.C.

[57] ABSTRACT

Binders for papercoating slips which permit uniform printability contain a polymer prepared by the seed procedure and comprising from 1 to 49% by weight of a polymer seed A) having a glass transition temperature of from $-80°$ to $+25°$ C. and based on esters of acrylic acid or methacrylic acid, and from 51 to 99% by weight of ethylenically unsaturated monomers B), from 10 to 100% by weight of which monomers are butadiene, the polymer seed A being added before or during the polymerization of the ethylenically unsaturated monomers.

4 Claims, No Drawings

PAPER COATING

This application is a 371 of PCT/EP95/0022400 filed on Jan. 23, 1995.

BACKGROUND OF THE INVENTION

1. Field of the Invention

The present invention relates to binders for papercoating slips which permit uniform printability, containing a polymer prepared by the seed procedure and comprising from 1 to 49% by weight of a polymer seed A) having a glass transition temperature of from −80° to +25° C. and based on esters of acrylic acid or methacrylic acid, and from 51 to 99% by weight of ethylenically unsaturated monomers B), from 10 to 100% by weight, based on B), of which monomers are butadiene, the polymer seed A being added before or during the polymerization of the ethylenically unsaturated monomers.

The present invention furthermore relates to the use of these binders, aqueous dispersions thereof and paper coating slips containing such binders and papers coated therewith.

2. Discussion of the Background

In offset printing on coated papers, a frequently encountered problem specific to this printing process is nonuniformity of the print, which is referred to technically as mottling. It is to date one of the unsolved problems in this area and occupies both paper manufacturers and printers. This phenomenon is an effect which occurs especially in multicolor offset printing in halftones and appears as a type of cloudiness in the color effect. The nonuniformity in the print reproduction is quite evidently due to the fact that the printing ink is better accepted on some parts of the paper and less well accepted on other parts.

The causes of this nonuniform ink acceptance have not been clarified to date.

The reasons why a better understanding of this phenomenon has not been acquired to date in spite of intensive efforts relate on the one hand certainly to the complicated offset printing process and on the other hand to the no less complicated structure of the paper as printing material.

In addition to optimizing the properties of both the paper and the printing ink, these components must be tailored to one another as well as being adapted to the offset printing process.

From the point of view of the paper manufacturer, not only do process engineering parameters in the papercoating process have a major effect in the case of coated papers, but the physicochemical properties of the coating components also play a decisive role here. The binders used in the coating slips are particularly important.

In addition to natural products, such as starch, polymer emulsions based on styrene and butadiene or styrene and acrylates are predominantly used as binders for papercoating slips.

It is known that there is a substantially higher tendency to mottling when binders based on butadiene (co)polymers, eg. styrene/butadiene copolymers, are used for coated offset papers, in comparison with acrylate (co)polymers, eg. styrene/acrylate copolymers.

It is also known that emulsions based on styrene/butadiene can be mixed with acrylate emulsions.

Japanese Preliminary Published Application 90/169 800 describes latex mixtures for paper coating which comprise butadiene copolymers and acrylate copolymers and are said to result in homogeneous printing ink acceptance in the paper coat. The latex mixtures contain acrylate copolymers having an alkyl acrylate content of from 20 to 50% by weight and have a minimum film formation temperature of from 35° to 80° C.

Japanese Preliminary Published Application 82/191 392 discloses polymer mixtures for paper coating which consist of a butadiene copolymer and an acrylonitrile copolymer and impart high gloss to the print on coated paper.

Furthermore EP-A 099 792 discloses aqueous polymer emulsions containing a mixture of butadiene/styrene copolymers and acrylates of $C_1$–$C_8$-alkanols, and the use thereof in adhesives.

The unpublished European Application 93116834.8 (O.Z. 0050/44391) discloses the use of binder mixtures containing from 1 to 49% by weight of a polymer of (meth)acrylates and from 51 to 99% by weight of a polymer based on butadiene/styrene in papercoating slips.

The unpublished German Patent Application P 4325851.4 (O.Z. 0050/44029) discloses step polymers of (meth) acrylates (1st step) and styrene/butadiene (2nd step).

SUMMARY OF THE INVENTION

It is an object of the present invention to provide binders which are suitable for papercoating slips and have a generally good property profile, particularly in offset printing, and at the same time permit improved uniform printability, ie. exhibit very little tendency to mottling.

We have found that this object is achieved by the binder, defined at the outset, for paper coating slips and by the papercoating slips.

Suitable polymer seeds (A) are polymers which have calculated (according to Fox) glass transition temperatures Tg of from −80° to 25° C., preferably from −60° to 0° C., particularly preferably from −50° to −15° C.

The glass transition temperature can be calculated according to Fox (T. G. Fox, Bull. Am. Phys. Soc. (Ser. II) 1 (1956) 123). According to the stated publication, the following is a good approximation for the glass transition temperature of copolymers:

$$\frac{1}{Tg} = \frac{X^1}{Tg^1} + \frac{X^2}{Tg^2} + \ldots + \frac{X^n}{Tg^n}$$

where $X^1, X^2 \ldots X^n$ are the mass fractions of the monomers 1, 2, ... n and $Tg^1, Tg^2 \ldots Tg^n$ are the glass transition temperatures of the monomers 1, 2 ... n in degrees Kelvin.

The Tg of the monomers are stated, for example, in J. Brandrup and E. H. Immergut, Polymer Handbook, 1st Ed., J. Wiley & Sons, New York 1966.

A polymer seed (A) is a polymer based on esters of acrylic acid or methacrylic acid, in particular with $C_4$–$C_{12}$-alkanols, eg. n-bu-tanol, 2-ethylhexanol, isobutanol, tert-butanol, n-pentanol, isoamyl alcohol, n-hexanol, cyclohexanol, octanol or lauryl alcohol.

A polymer seed (A) comprising ($a_1$) from 50 to 100, preferably from 50 to 99, particularly preferably from 80 to 99, % by weight of the abovementioned $C_4$–$C_{12}$-alkyl esters of acrylic acid and/or of methacrylic acid, ($a_2$) from 0 to 50, preferably from 0 to 35, particularly preferably from 0 to 20, % by weight of a vinylaromatic of not more than 20 carbon atoms, such as α-methylstyrene, p-methylstyrene, vinyltoluene or in particular styrene, and (a₃) from 0 to 15, preferably from 1 to 5, % by weight of further olefinically unsaturated monomers
is advantageously used.

DESCRIPTION OF THE PREFERRED EMBODIMENT

One or more unsaturated carboxylic acids and/or their amides and/or anhydrides, for example acrylic acid, acrylamide, methacrylic acid, methacrylamide or itaconic acid, maleic acid, fumaric acid, vinylsulfonic acid, vinylphosphonic acids or acrylamidopropanesulfonic acid and their water-soluble salts are preferred as (a₃).

Other suitable monomers (a₃) are monomers capable of free radical polymerization, such as olefins, eg. ethylene, vinyl halides and vinylidene halides, such as vinyl and vinylidene chloride, esters of vinyl alcohols and monocarboxylic acids of 1 to 18 carbon atoms, such as vinyl acetate, vinyl propionate, vinyl n-butyrate, vinyl laurate and vinyl stearate, esters of α,β-monoethylenically unsaturated dicarboxylic acids, such as maleic acid, fumaric acid and itaconic acid, with alkanols of, in general, 1 to 12, preferably 1 to 9, in particular 1 to 4, carbon atoms, such as dimethyl maleate or n-butyl maleate. Basic monomers, such as

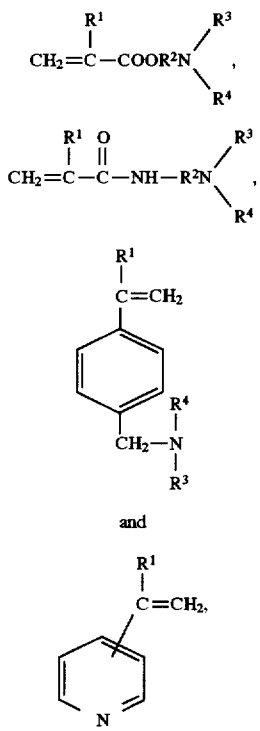

where
R¹ is H or CH₃,
R² is alkylene of 1 to 4 carbon atoms and
R³ and R⁴ are each H or alkyl of 1 to 4 carbon atoms,
or other monomers which contain basic centers, are capable of free radical polymerization and may also be present in N-protonated or N-alkylated form, for example the compound diallyldimethylammonium chloride, are further examples.

Crosslinking monomers may also be present in A). Examples of such monomers are conjugated C₄–C₈-dienes, such as 1,3-butadiene and isoprene, and monomers capable of free radical polymerization and having at least one epoxy, hydroxyl, N-alkylol, N-alkoxy, carbonyl or amidine group or at least two nonconjugated ethylenically unsaturated double bonds. A combination of such compounds is of course also possible. Examples of epoxy-containing monomers would be glycidyl acrylate, glycidyl methacrylate and vinyl glycidyl ether.

Preferred N-alkylol compounds are the N-alkylolamides of ethylenically unsaturated carboxylic acids where the alkyl radical is of 1 to 4 carbon atoms, such as N-methylolacrylamide,
N-ethanolacrylamide, N-propanolacrylamide, N-methylolmethacrylamide, N-ethanolmethacrylamide, N-methylolmaleimide, N-methylolmaleamide and N-methylol-p-vinylbenzamide.

Suitable N-alkoxymethylacrylamides and N-alkoxymethylmethacrylamides are primarily compounds where the alkoxy radical is of 1 to 8 carbon atoms, such as N-(methoxymethyl)acrylamide, N-(butoxymethyl) acrylamide, N-(methoxymethyl)methacrylamide and N-(butoxymethyl) methacrylamide, and methylolallyl carbamates whose methylol groups may be etherified with C₁–C₈-alkyl. Preferred carbonyl-containing monomers are acrolein, diacetoneacrylamide, formylstyrene, vinyl alkyl ketones and (meth)acryloyloxyalkylpropanals according to European Patent 0,003,516, diacetone acrylate, acetonyl acrylate, diacetone methacrylate, 2-hydroxypropyl acrylate acetylacetate and 1,4-butanediol acrylate acetylacetate.

An example of an aziridinyl-containing monomer is 2-(1-aziridinyl) ethyl methacrylate.

Examples of crosslinking components having at least two acrylate, methacrylate, alkyl or vinyl groups or corresponding combinations are alkylene glycol di(meth)acrylates, such as ethylene glycol diacrylate, 1,3-butylene glycol diacrylate, propylene glycol diacrylate and triethylene glycol dimethacrylate, 1,3-glyceryl dimethacrylate, 1,1,1-trimethylolpropane dimethacrylate, 1,1,1-trimethylolethane diacrylate, pentaerythrityl trimethacrylate, sorbitan pentamethacrylate, methylenebisacrylamide, methylenebismethacrylamide, divinylbenzene, vinyl methacrylate, vinyl crotonate, vinyl acrylate and divinyl adipate, diallyl phthalate, allyl methacrylate, allyl acrylate, diallyl maleate, diallyl itaconate, diallyl malonate, diallyl carbonate, triallyl citrate, divinyl ether, ethylene glycol divinyl ether and cyclopentadienylacrylate and methacrylate.

Further suitable monomers are those having SiR¹R²R³ groups, in which R¹, R² and R³ independently of one another are each C₁–C₄-alkyl or alkoxy, such as methyl, ethyl, methoxy or ethoxy, for example vinyltrialkoxysilanes, acryloyloxysilanes, eg. γ-methacryloyloxypropyltrimethoxysilane and methacryloyloxyethyltrimethylsilane.

In addition to the use of such crosslinking monomers, the cohesion of the polymer films can be increased in certain circumstances by adding metal salts, for example Ca, Mg or Zn salts, after the polymerization is complete, provided that they contain groups capable of bonding with these salts, for example carboxyl groups; furthermore, it is possible to add hydrazine derivatives, aminooxyalkanes and condensates based on formaldehyde, melamine, phenol and/or urea after polymerization is complete.

Where present, acrylonitrile or methacrylonitrile is preferably contained in amounts of less than 5, preferably less than 2, % by weight in the polymer seed (A).

In a preferred embodiment, polymers A) which were prepared in the presence of a molecular weight regulator, for example tertdodecyl mercaptan, carbon tetrachloride, carbon tetrabromide, trichlorobromomethane, butyl mercaptan, allyl alcohol, polytetrahydrofuran bisthiol, mercaptoethanol, acetylacetone, thioglycolic acid or thioglycolates, are used.

Such substances are preferably added to the reaction mixture in the form of a mixture with the monomers to be polymerized.

The polymer seed is preferably prepared by emulsion polymerization. An aqueous dispersion of dispersed polymer particles is obtained. The particle size can be brought to the desired magnitude by simple measures, such as variation of the amount of emulsifier or of the stirrer power.

Suitable emulsions generally have number average particle sizes of 10–1000 nm, in particular 20–500 nm, particularly preferably 50–200 nm, very particularly preferably 70–150 nm. Bimodal and multimodal particle size distributions may also be advantageous. The seed emulsions may in turn have been prepared using a suitable, more finely divided seed emulsion.

Ethylenically unsaturated monomers B) contain from 10 to 100, in particular from 20 to 80, particularly preferably from 20 to 50, % by weight of butadiene and from 0 to 90, in particular from 20 to 80, particularly preferably from 50 to 80, % by weight of styrene or the abovementioned vinylaromatics and from 0 to 10 % by weight of mono- or polyunsaturated carboxylic acids and/or amides thereof and/or anhydrides thereof, for example acrylic acid, methacrylic acid, itaconic acid or (meth)acrylamide.

Moreover, component (B) may contain from 0 to 10% by weight of further comonomers, preferably acrylonitrile and/or methacrylonitrile and/or esters of (meth)acrylic acid with $C_{1-c12}$-alkanols.

Molecular weight regulators in amounts of from 0 to 5% by weight, based on the amount of monomers used, may be employed for the preparation of the polymers (B). Suitable substances are mentioned in the preparation of the components (A).

The polymerization of the monomers B) can be carried out by emulsion polymerization using conventional free radical polymerization initiators.

Suitable free radical polymerization initiators are all those which are capable of initiating aqueous free radical emulsion polymerization. They may be both peroxides, for example alkali metal peroxodisulfates, dibenzoyl peroxide, γ-butylperpivalate, tert-butyl per-2-ethylhexanoate, 2,5-dimethyl-2,5-di-(tert-butylperoxy)-hexane or cumene hydroperoxide, and azo compounds, such as azobisisobutyronitrile or 2,2'-azobis-(2-amidinopropane) dihydrochloride.

Combined systems which are composed of at least one organic reducing agent and at least one peroxide and/or hydroperoxide, eg. tert-butyl hydroperoxide and the sodium salt of hydroxymethanesulfinic acid or hydrogen peroxide and ascorbic acid, are also suitable. Other suitable combined systems are those which additionally contain a small amount of a metal compound which is soluble in the polymerization medium and whose metallic component can occur in a plurality of valence states, for example ascorbic acid/iron(II) sulfate/hydrogen peroxide, the sodium salt of hydroxymethanesulfinic acid, sodium sulfite, sodium bisulfite or sodium metabisulfite frequently being used in place of ascorbic acid, and tert-butyl hydroperoxide or alkali metal peroxodisulfates and/or ammonium peroxodisulfates frequently being employed instead of hydrogen peroxide. As a rule, the amount of the free radical initiator systems used is from 0.1 to 3% by weight, based on the total amount of the monomers to be polymerized. Ammonium and/or alkali metal peroxodisulfates as such or as part of combined systems are particularly preferably used as initiators. Sodium peroxodisulfate is particularly preferably used.

The manner in which the free radical initiator system is added to the polymerization vessel in the course of the novel free radical aqueous emulsion polymerization is familiar to a person skilled in the art. It may all be initially taken in the polymerization vessel or may be used, continuously or in stages, at the rate at which it is consumed in the course of the free radical aqueous emulsion polymerization. Specifically, this depends, in a manner known per se to the person skilled in the art, both on the chemical nature of the initiator system and on the polymerization temperature. Preferably, some is initially taken and the remainder is added to the polymerization zone at the rate of consumption.

In the case of the emulsion polymerization, known ionic and/or nonionic emulsifiers and/or protective colloids or stabilizers can usually be used.

Suitable surfactants of this type are in principle the protective colloids and emulsifiers usually used as dispersants. A detailed description of suitable protective colloids appears in Houben-Weyl, Weyl, Methoden der organischen Chemie, Volume XIV/1, Makromole-kulare Stoffe, Georg-Thieme-Verlag, Stuttgart, 1961, pages 411 to 420. Suitable accompanying emulsifiers are anionic, cationic and nonionic emulsifiers. Exclusively emulsifiers whose relative molecular weights, in contrast to the protective colloids, are usually below 2000 are preferably used as accompanying surfactants. Where mixtures of surfactants are used, the individual components must of course be compatible with one another, which may be checked by means of a few preliminary experiments in case of doubt. Anionic and nonionic emulsifiers are preferably used as accompanying surfactants. Conventional accompanying emulsifiers are, for example, ethoxylated fatty alcohols (degree of ethoxylation: from 3 to 50, alkyl radical: $C_8$ to $C_{36}$), ethoxylated mono-, di- and trialkylphenols (degree of ethoxylation: from 3 to 50, alkyl radical: $C_4$ to $C_9$), alkali metal salts of dialkyl esters of sulfosuccinic acid and alkali metal and ammonium salts of alkylsulfates (alkyl radical: $C_8$ to $C_{12}$), of ethoxylated alkanols (degree of ethoxylation: from 4 to 30, alkyl radical: $C_{12}$ to $C_{18}$), of ethoxylated alkylphenols (degree of ethoxylation: from 3 to 50, alkyl radical: $C_4$ to $C_9$), of alkylsulfonic acids (alkyl radical: $C_{12}$ to $C_{18}$) and of alkylarylsulfonic acids (alkyl radical: $C_9$ to $C_{18}$).

Further suitable dispersants are compounds of the general formula II

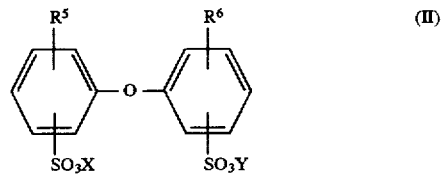

where $R^5$ and $R^6$ are each hydrogen or $C_4$–$C_{14}$-alkyl and are not simultaneously hydrogen and X and Y may be alkali metal ions and/or ammonium ions. $R^5$ and $R^6$ are each preferably linear or branched alkyl of 6 to 18, in particular 6, 12 or 16, carbon atoms or hydrogen and are not both simultaneously hydrogen. X and Y are each preferably sodium, potassium or ammonium ions, sodium being particularly preferred. Compounds II in which X and Y are each sodium, $R^5$ is branched alkyl of 12 carbon atoms and $R^6$ is hydrogen or $R^5$ are particularly advantageous. Industrial mixtures which contain from 50 to 90% by weight of the monoalkylated product, for example Dowfax® 2A1 (trademark of Dow Chemical Company) are frequently used.

Further suitable emulsifiers are described in Houben-Weyl, Methoden der organischen Chemie, Volume XIV/1, Makromolekulare Stoffe, Georg Thieme Verlag, Stuttgart, 1961, pages 192 to 208.

The dispersions can also be prepared using a protective colloid in addition to an emulsifier which is present or in the absence of an emulsifier, and the amount of the protective colloid may be up to 100, preferably from 0.5 to 30, % by weight, based on the amount of the monomers used.

In the process, this protective colloid may be added completely or partly, at the same time or at different times, together with the monomers or separately therefrom; it may be advantageous initially to take up to 30, preferably up to 10, % by weight, based on monomers, of protective colloid in aqueous solution.

Examples of natural protective colloids are starch, casein, gelatine and alginates, and examples of modified natural products are hydroxyethylcellulose, methylcellulose and carboxymethylcellulose as well as cationically modified starch. Suitable synthetic protective colloids include polyacrylic acid and salts thereof, polyacrylamides, water-soluble acrylic acid copolymers, water-soluble acrylamide copolymers, polyvinylpyrrolidones, polyvinyl alcohols and partially hydrolysed polyvinyl alcohols.

It may be advantageous if a part of the protective colloid is grafted onto the polymer.

The emulsion polymerization is carried out as a rule at from 30° to 95° C., preferably from 75° to 90° C. The polymerization medium may consist of water alone or of a mixture of water and water-miscible liquids, such as methanol. Water alone is preferably used. The emulsion polymerization may be carried out both as a batch process and in the form of a feed process, including the step or gradient procedure. The feed process, in which a part of the polymerization batch is initially taken, heated to the polymerization temperature and polymerized and the remainder of the polymerization batch is added to the polymerization zone continuously, gradually or with superposition of a concentration gradient while maintaining the polymerization, usually via a plurality of spacially separate feeds, one or more of which contain the monomers in pure or emulsified form, is preferred.

The novel free radical aqueous emulsion polymerization can of course also be carried out at superatmospheric or reduced pressure.

The polymer seed A), preferably in the form of its aqueous dispersion, may be used at the beginning of an emulsion polymerization of the monomers B) for producing a defined number of dispersion particles (initially taken material) or may be added later, during the emulsion polymerization (added amount). In the initially taken material, the polymer seed A) may be used both alone and in combination with any other polymer seed. If the seed is subsequently added, the addition may be effected at the time when the growing particles in the polymerization of B) have reached the mean particle diameter of the polymer seed particles. A monomodal particle size distribution of the resulting emulsion is then the result at the end of the polymerization. However, the addition may also be effected at any other time. The result is then a bimodal particle size distribution. The polymer seed emulsion may also be added at a plurality of different times. A polymer seed emulsion having different mean particle sizes may be used at the different times of addition. Different particle size distributions result.

The binder obtained contains the polymer seed A) in amounts of from 1 to 49, preferably from 1 to 19, particularly preferably from 3 to 15, % by weight, based on solids content. The monomers (B) are present in amounts of from 51 to 99, preferably from 81 to 99, particularly preferably from 85 to 97, % by weight, based on the solids content, the amounts of A) and B) summing to 100.

The binder comprising A) and B) is preferably used in the form of aqueous emulsions in papercoating slips.

The novel aqueous polymerization emulsions of the binder are as a rule prepared with total solids contents of from 15 to 75, preferably from 40 to 60, % by weight.

The emulsion may contain conventional assistants, such as potassium hydroxide, ammonia or ethanolamine as neutralizing agent, silicone compounds as antifoams, biocides and silicone oils or waxes for reducing the tack.

The binders or their aqueous emulsions may be used, for example, in or as coating materials, for example surface coatings, adhesives, eg. contact adhesives, or papercoating slips.

The novel papercoating slips contain the binders based on A) and B) preferably in amounts of from 1 to 20, in particular from 5 to 15, % by weight, based on the pigment content of the papercoating slips.

Pigments are usually the main component of the papercoating slips. Frequently used pigments are, for example, barium sulfate, calcium carbonate, calcium sulfoaluminate, kaolin, talc, titanium dioxide, zinc oxide, chalk or coating clay.

The papercoating slips may also contain conventional dispersants. Suitable dispersants are polyanions, for example of polyphosphoric acids or of polyacrylic acids (polysalts), which are usually present in amounts of from 0.1 to 3% by weight, based on the amount of pigment.

The papercoating slips may also contain cobinders. Examples of natural cobinders are starch, casein, gelatine and alginates, and examples of modified natural products are hydroxyethylcellulose, methylcellulose and carboxymethylcellulose as well as cationically modified starch. However, conventional synthetic cobinders, for example those based on vinyl acetate or acrylate, may also be used.

These may be present in amounts of from 0.1 to 10% by weight, based on the amount of pigment.

The novel papercoating slips can be applied by conventional methods to the papers to be coated (cf. Ullmann's Encyklopädie der Technischen Chemie, 4th edition, Volume 17, page 603 et seq.).

In the subsequent printing process, the papers coated in this manner have good uniform printability, ie. very little tendency to mottling.

EXAMPLES

Example 1

Preparation of an Emulsion using a Polymer Seed A) in the Intially Taken Material
Preparation of the Polymer Seed
Initially Taken Material:
280.0 g of demineralized water
63.0 g of sodium laurylsulfate, 10% strength in water
10.0 g of sodium $C_{12}$-alkyldiphenyletherdisulfonate, 45% strength in water
86.0 g of feed 1
6.3 g of feed 2
Feed 1
445.0 g of demineralized water
144.0 g of sodium laurylsulfate, 10% strength in water
100.0 g of sodium $C_{12}$-alkyldiphenyletherdisulfonate, 45% strength in water
31.0 g of acrylic acid
900.0 g of n-butyl acrylate
100.0 g of styrene
Feed 2:
120.0 g of demineralized water
5.0 g of sodium persulfate The initially taken material was heated to 85° C. in a stirred flask and polymerized for 15 minutes. Thereafter, the remaining amount of feed 1 was metered in at 85° C. over a period of 2 hours and, beginning at the same time as feed 1, feed 2 was metered in over a period of 2.5 hours. The reaction mixture was then stirred for a further hour at 85° C. An emulsion having a solids content of 49.5% was obtained, the number average particle size (Malvern Autosizer) being 71 nm and the LD value 97%.

The LD value as a measure of the particle size gives the turbidity of an emulsion having a solids content of 0.01% by weight relative to distilled water for a layer thickness of 2.5 cm and at room temperature $$LD = \frac{Intensity_{Emuls.} \times 100}{Intensity_{water}}$$

Preparation of the Binder
Initially Taken Material:
6000.0 g of demineralized water
16.7 g of sodium $C_{12}$-alkyldiphenyletherdisulfonate, 45% strength in water
3030.0 g of emulsion of the polymer seed, as obtained above
1107.0 g of feed 1
212.0 g of feed 2
Feed 1
5124.0 g of demineralized water
5100.0 g of butadiene
9375.0 g of styrene
541.0 g of acrylic acid
120.0 g of tert-dodecyl mercaptan
133.3 g of sodium $C_{12}$-alkyldiphenyletherdisulfonate, 45% strength in water
250.0 g of sodium laurylsulfate, 15% strength in water
Feed 2
120.0 g of sodium persulfate
2000.0 g of demineralized water The intially taken material was heated to 85° C. in a stirred pressure-resistant vessel and polymerized for 15 minutes. Thereafter, the remaining amount of feed 1 was metered in at 85° C. over a period of 4.5 hours and, beginning at the same time as feed 1, feed 2 was metered in over a period of 4.5 hours. The reaction mixture was then stirred for a further hour at 85° C. An emulsion having a solids content of 50.6% was obtained, the particle size (Malvern Autosizer) being 156 nm, and the LD value 54%. The glass transition temperature was 25° C., calculated according to Fox.

Example 2
Preparation of an Emulsion using a Subsequently Added Polymer Seed
Preparation of the Polymer Seed
Initially Taken Material:
210.0 g of demineralized water
10.5 g of sodium laurylsulfate, 10% strength in water
1.7 g of sodium $C_{12}$-alkyldiphenyletherdisulfonate, 45% strength in water
61.1 g of feed 1
5.2 g of feed 2
Feed 1
430.0 g of demineralized water
12.0 g of sodium laurylsulfate, 10% strength in water
5.0 g of sodium $C_{12}$-alkyldiphenyletherdisulfonate, 45% strength in water
23.0 g of acrylic acid
675.0 g of n-butyl acrylate
75.0 g of styrene
Feed 2:
100.0 g of demineralized water
3.75 g of sodium persulfate The initially taken mixture was heated to 85° C. in a stirred flask and polymerized for 15 minutes. Thereafter, the remaining amount of feed 1 was metered in at 85° C. over a period of 2 hours and, beginning at the same time as feed 1, feed 2 was metered in over a period of 2.5 hours. The reaction mixture was then stirred for a further hour at 85° C. An emulsion having a solids content of 49.4% was obtained, the particle size (Malvern Autosizer) being 120 nm and the LD value 88%.

Preparation of the Binder
Initially Taken Material:
5820.0 g of demineralized water
98.0 g of sodium laurylsulfate, 10% strength in water
1164.0 g of feed 1
315.0 g of feed 2
Feed 1
5124.0 g of demineralized water
5100.0 g of butadiene
9375.0 g of styrene
541.0 g of acrylic acid
120.0 g of tert-dodecyl mercaptan
133.3 g of sodium $C_{12}$-alkyldiphenyletherdisulfonate, 45% strength in water
250.0 g of sodium laurylsulfate, 15% strength in water
Feed 2:
120.0 g of sodium persulfate
2000.0 g of demineralized water
Feed 3:
2884.0 g of emulsion of the polymer seed as obtained above The initially taken material was heated to 85° C. in a stirred pressure-restant vessel and polymerized for 15 minutes. Thereafter, the remaining amount of feed 1 was metered in at 85° C. over a period of 4.5 hours and, beginning at the same time as feed 1, feed 2 was metered in over a period of 4.5 hours. 1.5 hours after the beginning of the metering of the remaining amount of feed 1 and feed 2, feed 3 was added all at once in the course of 3 minutes. After the end of the addition of feed 1 and feed 2, the reaction mixture was stirred for a further hour at 85° C. An emulsion having a solids content of 50.3% was obtained, the particle size (Malvern Autosizer) being 50%. The glass transition temperature was 24° C.

Example 3
Preparation of a Polymer Emulsion Based on Butadiene Without the use of a Polymer Seed
Initially Taken Material:
19.4 kg of demineralized water
0.25 kg of sodium laurylsulfate, 10% strength in water
3.88 kg of feed 1
1.05 kg of feed 2
Feed 1
24.25 kg of demineralized water
17.5 kg of butadiene
31.0 kg of styrene
1.5 kg of acrylic acid
0.5 kg of tert-dodecyl mercaptan
2.75 kg of sodium laurylsulfate, 15% strength in water
Feed 2:
0.4 kg of sodium persulfate
4.85 kg of demineralized water The initially taken material was heated to 85° C. and polymerized for 15 minutes. Thereafter, the remainder of feed 1 was added in the course of 5 hours and, beginning at the same time as feed 1, feed 2 was added in the course of 5.5 hours. Polymerization was then continued for 2 hours at 85° C. An emulsion having a particle size (Malvern Autosizer) of 170 nm and a solids content of 50% was obtained. The glass transition temperature was 17° C.

USE EXAMPLES

The emulsions described in the examples were used as binders in a papercoating slip of the following composition (parts are parts by weight):

60 parts of finely divided chalk
40 parts of finely divided clay
1 part of carboxymethylcellulose
0.6 part of a sodium salt of a polyacrylic acid having a molecular weight of 4000 (BASF polysalt)
12 parts of binder emulsion (Solids content: 66% by weight, pH from 8.5 to 9, adjusted with NaOH).

The base paper used was a wood-free coating paper having a basis weight of 70 g/m². The coating slip was applied on both sides, in each case in an amount of 13 g/m², on a pilot coating machine (application method: roll, metering method: blade) at a speed of 1000 m/min. The paper web was brought to a paper moisture content of 5.5% by means of an IR drying unit and air drying.

The maximum web temperature was 100° C.

The paper web was calendered by means of a single pass through a supercalender. The nip pressure was 250 kN/m, the web speed was 300 m/min and the temperature was 80° C.

In order to evaluate the printability, mottling scan values were determined with the aid of a Tobias tester. (The method of measurement is described in: Philipp E. Tobias et al., Tappi Journal, Vol. 72, No. 5, May 1989.) The mottle scan values were determined in a colored area which was printed with an ink coverage of 50% of the maximum ink coverage of the color cyan on a 4-color offset printing press by the sheet-fed offset printing process.

| Binder | Mottling scan value |
| --- | --- |
| Example 1 | 425 |
| Example 2 | 358 |
| Example 3 | 623 |

A low mottling scan value means good printability, ie. little mottling.

We claim:

1. A method comprising printing by offset printing a paper coated with a papercoating slip;
   wherein the papercoating slip contains as binder a polymer prepared by the seed procedure and comprising (i) from 1 to 49% by weight of a polymer seed (A) having a glass transition temperature of from $-80°$ to $+25°$ C. and based on esters of acrylic acid or methacrylic acid and (ii) from 51 to 99% by weight of ethylenically unsaturated monomers B), from 10 to 100% by weight, based on B, of which monomers are butadiene, the polymer seed A being added before or during the polymerization of the ethylenically unsaturated monomers.

2. The method according to claim 1, wherein the polymer seed (A) is a polymer of ($a_1$) from 50 to 100% by weight of an ester of acrylic acid or of methacrylic acid with a $C_4$–$C_{12}$-alkanol or a mixture of such esters, ($a_2$) from 0 to 50% by weight of a vinylaromatic, and ($a_3$) from 0 to 15% by weight of further olefinically unsaturated monomers.

3. The method according to claim 1, wherein the polymer seed (A) is a polymer of ($a_1$) from 80 to 99% by weight of an ester of acrylic acid or of methacrylic acid with a $C_4$–$C_{12}$-alkanol or a mixture of such esters, ($a_2$) from 0 to 20% by weight of styrene or of a styrene derivative or a mixture thereof and ($a_3$) from 1 to 5% by weight of acrylic acid or methacrylic acid or a mixture thereof.

4. A coated paper, comprising:

a paper coating slip; and paper; wherein said paper coating slip comprises pigments and 1 to 20% by weight, based on the pigment content, of a binder, wherein said binder comprises a polymer prepared by the seed procedure and comprises:

(i) from 1 to 49% by weight of a polymer seed (A) having a glass transition temperature of $-80°$ to $+25°$ C. and based on esters of acrylic acid or methacrylic acid; and (ii) from 51 to 99% by weight of an ethylenically unsaturated monomers (B), wherein (B) comprises 10 to 100% by weight, based on (B), of butadiene monomers; the polymer seed A being added before or during the polymerization of said ethylenically unsaturated monomers (B), wherein said coated paper is suitable for offset printing.

* * * * *